Oct. 27, 1925.

F. WORTHEN

TRANSMISSION

Filed Oct. 9, 1924

1,558,959

Witnesses:

Inventor
FAYETTE WORTHEN.

Attorney

Patented Oct. 27, 1925.

1,558,959

UNITED STATES PATENT OFFICE.

FAYETTE WORTHEN, OF OAKLAND, CALIFORNIA.

TRANSMISSION.

Application filed October 9, 1924. Serial No. 742,678.

*To all whom it may concern:*

Be it known that I, FAYETTE WORTHEN, a citizen of the United States, residing at Oakland, in the county of Alameda and State of California, have invented certain new and useful Improvements in Transmissions, of which the following is a specification.

This invention appertains to transmission mechanism and more particularly to a novel transmission which is especially adapted to be used in connection with motor vehicles.

The primary object of the present invention is to provide a transmission which will be noiseless in use and in which the necessity of shifting gears and the difficulties contingent therewith is eliminated.

A further object of the invention is to provide an automobile transmission in which the various speeds both forward and reverse can be had by the shifting of a single friction member.

A still further object of the invention is to provide an improved transmission of the above character which will be durable and efficient in use, one that will be simple and inexpensive to manufacture and one which can be placed upon the market and incorporated with an automobile at a low cost.

Figure 1:
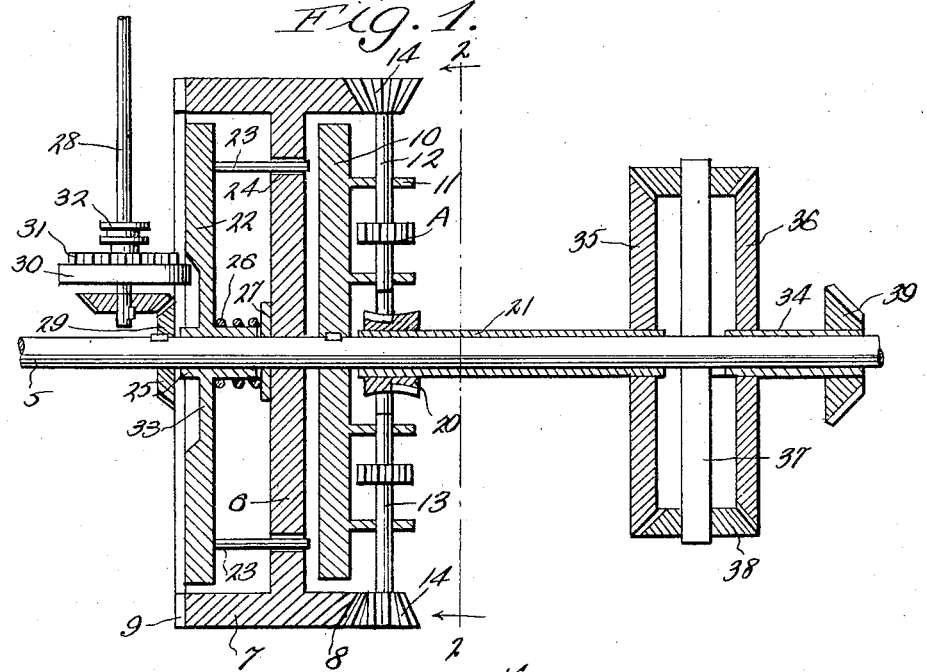

With these and other objects in view, the invention consists in the novel construction, arrangement and formation of parts, as will be hereinafter more fully described, claimed and illustrated in the accompanying drawings, in which drawings, Figure 1 is a longitudinal section through the transmission the housing therefore not being shown.

Figure 2:
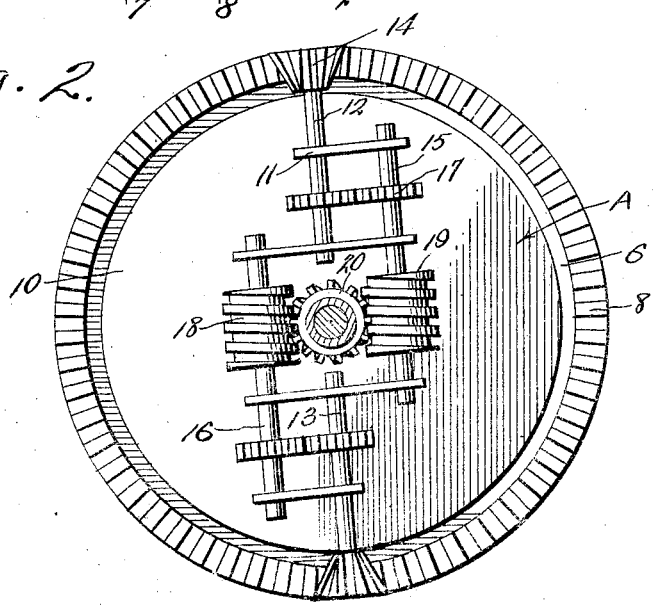

Figure 2 is a section through the transmission taken on the line 2—2 of Figure 1.

Referring to the drawings in detail, wherein similar reference characters designate corresponding parts throughout the several views, the letter A generally indicates the improved transmission mechanism, which comprises the drive or propeller shaft 5, which is adapted to be connected to the end of the engine crank shaft by any preferred type of clutch not shown. Rotatably mounted on the drive shaft 5 is a disk shaped plate 6 provided with an annular rim 7. As shown the rear edge of the rim 7 is provided with a beveled gear 8, while the forward edge of the rim is provided with a spur gear 9.

Keyed to the drive shaft 5 and arranged within the rim 7 is a supporting disk 10 provided with pairs of bearings 11, which are disposed radially of the drive shaft 5. These bearings 11 support rotatable radially extending shafts 12 and 13 the outer terminals of which have keyed or otherwise secured thereto beveled pinions 14 which mesh with the beveled gear 8. Disposed in parallel relation to the shafts 12 and 13 and mounted within the bearings 11 are shafts 15 and 16 which are operatively connected to the shafts 12 and 13 by intermeshing spur gears 17. These shafts 15 and 16 are located on the opposite side of the drive shaft 5 and are provided with worms 18 and 19 which mesh with a worm gear 20. This worm gear 20 is keyed or otherwise secured to a hollow shaft 21 rotatably mounted on the drive shaft 5 in rear of the supporting disk 10.

A friction disk 22 is rotatably and slidably mounted on the shaft 5 and is located within the rim 7 forwardly of the plate 6 and this disk is provided with rigid guide pins 23 which slidably extend through openings 24 in the said plate 6. This friction disk 22 is provided with a hub 25 for receiving the drive shaft and an expansion spring 26 is coiled about the hub and engages the friction plate 22 and a washer 27 which is keyed or otherwise affixed to the drive shaft 5.

A counter shaft 28 extends radially of the drive shaft 5 and is arranged for rotation but for non-sliding movement relative to the shaft 5. The counter shaft 28 is operatively connected to the drive shaft 5 by the use of beveled gears 29. Feathered upon the shaft 28 as a unit is a friction disk 30, a spur gear 31 and a shifting collar 32. The friction disk 30 is adapted to engage the friction disk 22 when the same is slid along the counter shaft 28 to a pre-determined position and it is to be noted that the friction disk 22 adjacent to the hub 25 is reduced in thickness as at 33 so that the friction disk 30 will be permitted to lie within said reduced portion without engaging the friction disk. The spur gear 31 is adapted to engage the spur gear 9 formed on the forward edge of the rim 7 when the friction disk 30 engages the disk 22 adjacent to the periphery thereof for a purpose, which will be hereinafter more fully described.

A hollow shaft 34 is rotatably mounted on the drive shaft 5 adjacent to the rear end thereof and is disposed in spaced relation to the hollow shaft 21 and these hollow shafts 21 and 34 are provided with facing beveled gears 35 and 36.

The shaft 5 between the facing gears 35 and 26 is provided with radially extending rigid arms 37, the terminals of which have rotatably mounted thereon beveled pinions 38 which mesh with the beveled gears 35 and 36. It can be seen that the beveled gears 35 and 36, the pinions 38 and the arms 37 constitute a differential, the purpose of which will also be hereinafter more fully described. The terminal of the hollow shaft 34 is provided with a beveled drive gear 39 for operating the drive axle of the vehicle.

It is to be noted that parts 5, 10, 12, 13, 15, 16 and the arms 37 and the gears 38 rotate as a unit and that all other parts are freed from the drive shaft except when connected through gears 20 worms 18 and 19, beveled pinions 14 and the beveled gear 8.

In view of the angle of the teeth of the spiral worm gear 20, the spiral worm gear 20 cannot turn the worm wheels 18 and 19 hence ordinarily or in high speed, the gears on the shafts 12, 13, 15 and 16 turn as a whole with the drive shaft 5. As the worms 18 and 19 which are carried by the plate 10 and the shafts 15 and 16 can turn the worm gear 20, the same will cause the hollow shaft 21 to turn faster than the drive shaft 5 and there will be a reduction of speed of the drive pinion 39 in relation to the shaft 5 by the differential comprising the gears 35 and 36 and the pinions 38.

Assuming that the mechanism is in high speed as shown in Figure 1 of the drawing and all parts are revolving as a whole, speed reduction can be had by shifting the shifting collar 32 on the counter shaft 28. Now the friction wheel 30 will now engage the friction disk 22 and this contact will be positive in view of the arrangement of the spring 26. The beveled gears 29 are of such size and proportion, that the friction gear 30 will have the same speed as the disk 22 when it first engages the surface of the friction disk 22. Upon moving the friction wheel 20 further toward the periphery of the friction disk 22 a speed reduction between 7 and 30 relative to the supporting disk 10 will be had, thus causing a rotation of gears 14, shafts 12 and 13, and worm wheels 18 and 19. As the spiral worm wheel 20 exerts a tension on worm wheels 18 and 19 whenever the mechanism is in forward speed, it will be seen that when the worm wheels 18 and 19 are caused to revolve as above described, and the spiral worm gear 20 and hollow shaft 21 will gain speed on the drive shaft 5 and the engine side of the differential will have a greater speed with a decrease of speed of the drive pinion 39 in relation to the drive shaft 5.

As the gear 21 and the friction wheel 30 are moved further away from the drive shaft 5, the above described action will increase until at a point adjacent to the periphery of the friction disk 22, there will be enough action as to cause the hollow shaft 21 to turn twice as fast as the drive shaft 14 and then drive pinions 39 must become stationary or neutral. Should the action be carried beyond a point where the hollow shaft 21 will turn more than twice as fast as the drive shaft 5 it is apparent from the function of the differential mechanism that the drive pinion 39 will revolve in opposite direction and hence will drive the vehicle in reverse.

It can be seen that from high speed to neutral there is always the tendency for the hollow shaft 21 to revolve faster than the shaft 5, it being prohibited only by virtue of the angle of the teeth on the worm gear 20 relative to the worm wheels 18 and 19 and that there has been no strain between the friction gear 30 and the friction disk 22.

However in reverse there is a driving train throughout the mechanism and in provision of this contingency I have arranged the gear 31 in such a manner that the same will mesh with the gear 9 on the rim 7 which prevents the slipping between the parts.

From the foregoing description, it can be seen that I have provided an exceptionally simple and durable differential mechanism in which all strain is eliminated in forward speed and in which the necessity of shifting gears is entirely eliminated. It is to be also noted that there is no motion within the mechanism when driving in high speed.

Changes as to details may be made without departing from the spirit or the scope of this invention but:—

What I claim as new is:—

1. A transmission mechanism comprising a drive shaft, a hollow shaft rotatably mounted on the drive shaft, a drive pinion rotatably mounted on the drive shaft, a differential mechanism including facing gears operatively connected with the hollow shaft and the drive pinion, rigid arms carried by the drive shaft and pinions rotatably carried by the arms meshing with the facing gears, a supporting and guide disk keyed to the drive shaft, a plate rotatably mounted upon the drive shaft, means operatively connecting the plate with the hollow shaft including a worm wheel and worm gears, a counter shaft rotatably connected with the drive shaft, a friction disk carried by the plate and a friction wheel slidably mounted upon the counter shaft arranged to engage the friction disk.

2. In a differential mechanism, a drive shaft, a hollow shaft rotatably mounted upon the drive shaft, a drive pinion, a supporting disk secured to the drive shaft, a plate rotatably mounted upon the drive shaft, means carried by the disk for operatively connecting the plate with the hollow shaft including a worm gear and worm wheels, a friction disk carried by the plate, a shaft rotatably connected with the drive shaft, and a friction wheel slidably mounted upon the shaft for engagement with the friction disk, and a differential mechanism operatively connecting the hollow shaft, drive shaft and drive pinion together.

3. In a transmission mechanism a drive shaft, a hollow shaft rotatably mounted upon the drive shaft, a drive pinion rotatably mounted upon the drive shaft, a supporting disk keyed to the drive shaft, a plate rotatably mounted upon the drive shaft, means carried by the disk operatively connecting the plate with the hollow shaft including a worm gear and worm wheels, a resilient friction disk carried by the plate, a spur gear carried by the plate, a counter shaft rotatably connected with and driven by the drive shaft, a friction wheel slidably mounted upon the counter shaft arranged for movement across and engagement with the friction disk, a gear connected with the friction disk for sliding movement therewith arranged to engage the gear carried by the plate when the friction wheel is in one of its adjusted positions, and a differential mechanism including arms rigidly carried by the drive shaft, beveled pinions rotatably carried by the arms, and facing beveled gears rigidly carried by the hollow drive shaft and drive pinion engaging the pinions carried by said arms.

4. In a transmission mechanism, a drive shaft, a hollow shaft rotatably mounted upon the drive shaft, a pinion rotatably mounted upon the drive shaft, a supporting disk secured to the drive shaft for movement therewith, bearings carried by the disk, radially extending shafts rotatably mounted within the bearings, a plate rotatably mounted upon the drive shaft, a beveled gear and a spur gear carried by the plate, beveled pinions keyed to the shafts carried by the disk for engaging the beveled gear on the plate, worm wheels carried by said shaft mounted on the disk, a worm gear keyed to the hollow shaft for meshing with said worms, a friction disk carried by said plate, a counter shaft connected with the drive shaft for rotation, a friction wheel feathered on said counter shaft for sliding movement over said friction disk, and a differential operatively connecting the drive shaft the counter shaft and drive pinion together.

5. In a differential mechanism, a drive shaft, a hollow shaft rotatably mounted upon the drive shaft, a second hollow shaft rotatably mounted upon the drive shaft in spaced relation to the first mentioned hollow shaft, a drive pinion keyed to the second mentioned hollow shaft, a supporting disk keyed to the drive shaft forwardly of the first mentioned hollow shaft, radially extending driven shafts rotatably carried by the disk, a plate rotatably mounted upon the drive shaft having a beveled and a spur gear, beveled pinions carried by the driven shafts meshing with the beveled gear, a worm gear keyed to the first mentioned hollow shaft, worms carried by the driven shafts meshing with said worm gears, a resiliently mounted friction disk slidably carried by the plate, a counter shaft extending radially of the drive shaft, gears connecting the drive and counter shafts together, a spur gear feathered on the counter shaft, a friction wheel feathered on the counter shaft for movement with the spur gear arranged to slide radially across and in engagement with the friction disk, the spur gear being adapted to mesh with the spur gear on the plate in one of the adjusted positions thereon, and a differential mechanism operatively connecting the drive shaft and the hollow shafts together.

6. In a transmission mechanism, a drive shaft a hollow shaft rotatably mounted upon the drive shaft, a second hollow shaft rotatably mounted upon the drive shaft in spaced relation to the first mentioned hollow shaft, a drive pinion secured to the second mentioned hollow shaft, a supporting disk keyed to the drive shaft, bearings carried by the supporting disk, radially extending shafts rotatably carried by the bearings and extending radially from each side of the drive shaft, a second pair of shafts carried by said bearings and operatively connected to the first mentioned shafts carried by the bearings and arranged on each side of the drive shaft, a worm gear keyed to the first mentioned hollow shaft, worm wheels secured to the second mentioned pair of shafts supported by the bearings and meshing with the worm gear, a plate rotatably mounted on the drive shaft operatively connected with the first mentioned shafts mounted upon bearings carried by the disk, a friction disk carried by the plate, a counter shaft operatively connected with the drive shaft, a sliding friction wheel feathered on the counter shaft and arranged for movement over the friction disk, and a differential mechanism operatively connecting the drive shaft and the hollow shafts together.

In testimony whereof I affix my signature.

FAYETTE WORTHEN.